Figure 2:
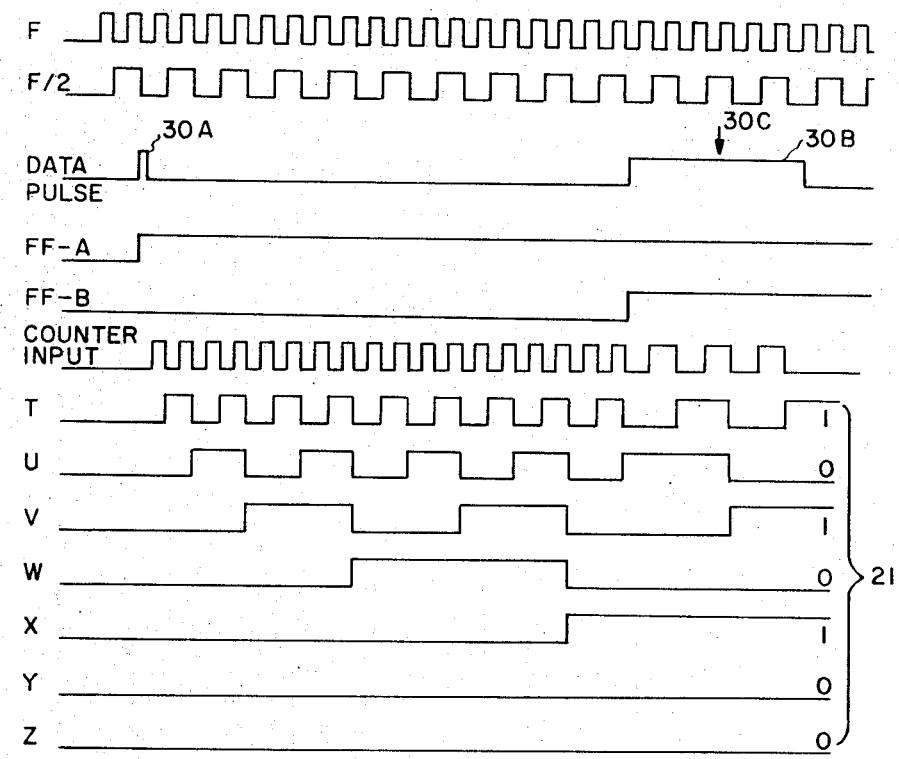

United States Patent

[11] 3,568,060

| | | |
|---|---|---|
| [72] | Inventor | Joseph A. Howells<br>Cinnaminson, N.J. |
| [21] | Appl. No. | 676,268 |
| [22] | Filed | Oct. 18, 1967 |
| [45] | Patented | Mar. 2, 1971 |
| [73] | Assignee | Science Accessories Corporation<br>Southport, Conn. |

[54] PULSE CENTER FINDER EMPLOYING DUAL COUNTER RATE WITH SYNCHRONOUS OPERATION
6 Claims, 4 Drawing Figs.

[52] U.S. Cl. .................................................. 324/186, 328/108
[51] Int. Cl. ................................................. G04f 9/00
[50] Field of Search .......................................... 324/68 (C); 328/109, 108; 307/234, 289

[56] References Cited
UNITED STATES PATENTS

| 2,806,205 | 9/1957 | Donath | 324/68(C) |
| 3,309,463 | 3/1967 | Roedl | 324/68(C)X |
| 3,363,187 | 1/1968 | Hickin | 328/108 |
| 3,467,839 | 9/1969 | Miller | 307/289 |

Primary Examiner—Alfred E. Smith
Attorney—Frank R. Trifari

ABSTRACT: A device for digitally indicating the center of a pulse employing a pulse counter and a pulse generator having a fixed generating rate. Upon receipt of an initial pulse a first flip-flop opens a first gating circuit and passes pulses to the counter. A second flip-flop receives the leading edge of a subsequent pulse to turn off the first gate and opens a second gate. The second gate in turn allows pulses at one-half the fixed generating rate to accumulate in the counter. The trailing edge of the second pulse changes the state of the second flip-flop and turns off the second gate. The accumulated count is now representative of the measure from the initial timing pulse to the center of the second pulse. A further flip-flop, upon receipt of a further pulse, changes state and insures that the gating circuits do not open to permit further counting. The two level counting is accomplished by a pulse frequency dividing stage connected to the pulse source, or, alternatively, by using the output of the first counter stage.

INVENTOR.
J. A. HOWELLS
BY
AGENT

PULSE CENTER FINDER EMPLOYING DUAL COUNTER RATE WITH SYNCHRONOUS OPERATION

This invention relates to pulse-measuring devices and more particularly to an arrangement for indicating the effective time center of a pulse of variable width.

In data acquisition systems, particularly those employing pulse generation, accuracy in pulse position is important. In systems for measuring the occurrence of an event as indicated by a pulse of uncertain or variable width, it is important to effectively indicate the center as measured between the leading and trailing edges of the pulse. For example, in magnetostrictive spark chambers it is important to determine the spark position with regard to the initiating pulse. The spark pulse will vary in accordance with chamber ionization density, gas composition, multiple sparking effects, and the like. The position of the spark is most accurately determined when the center position is determined, independently of pulse width or shape.

A conventional technique for determining the distance between two pulses is to gate on a high-speed counter with the initial pulse, and gate the counter off with the subsequent pulse. This leaves something to be desired in cases where the subsequent pulse is of variable width. The distance between an initial pulse and the center of a subsequent pulse has been digitally determined by employing a first counting rate beginning with an initial pulse and a second counting rate beginning with the leading edge of the subsequent pulse. However, prior systems employing this technique are somewhat inaccurate, in failing to provide synchronous operation between the dual counting rates, in allowing pulse splitting and inaccurate counts to occur, and in not providing for automatic lock out of spurious or additional pulses.

It is accordingly the primary object of the present invention to measure the distance between an initial pulse and the effective center of a subsequent pulse of uncertain or variable width.

It is a further object of the present invention to measure the distance between an initial pulse and the effective center of a subsequent pulse using a synchronous bifrequency pulse counting.

It is a still further object of the present invention to measure the distance between an initial pulse and the effective center of a subsequent pulse using a synchronous bifrequency pulse counting technique which is unaffected by subsequent spurious or additional pulses.

The foregoing objects are attained by an arrangement employing a source of pulses having a predetermined repetition rate depending primarily on the degree of resolution desired. The pulses are counted at the predetermined rate by a counter which has been gated on in response to the initial data pulse. A frequency divider breaks down the pulse source rate by one half. The counter, in response to the leading edge of a subsequent data pulse, is gated off to the first source rate, and gated on to the rate appearing from the divider. This condition remains for the duration of the subsequent data pulse. The trailing edge of the data pulse gates off the counter. The accumulated count in the counter is a digital indication of the spacing between the initial data pulse and the effective center of the subsequent data pulse. A logic circuit responsive to further data pulses insures that the counter will not erroneously resume counting.

Figure 1:
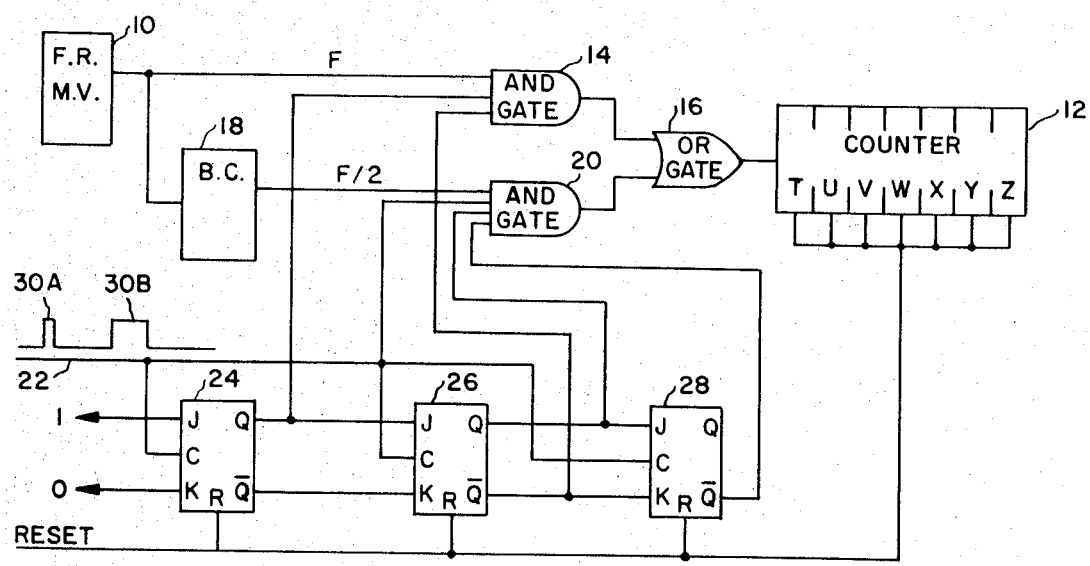
Figure 3:
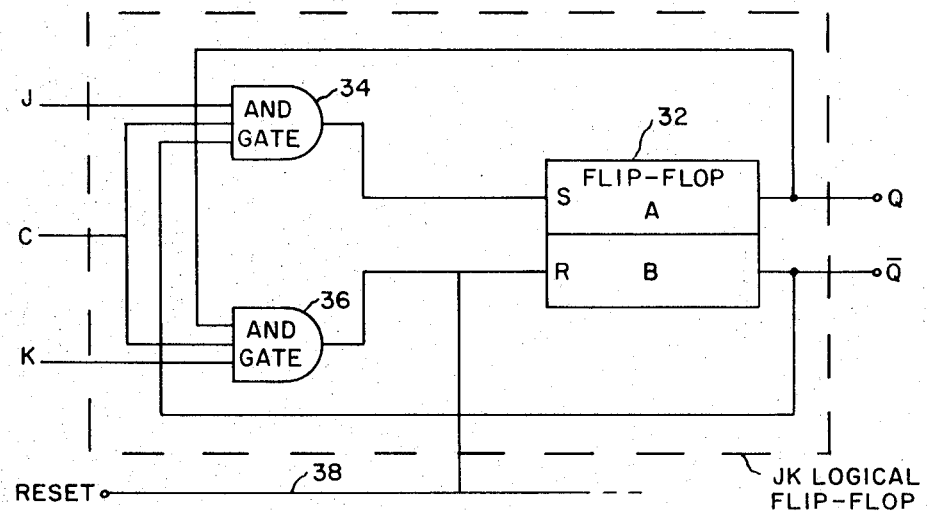
Figure 4:
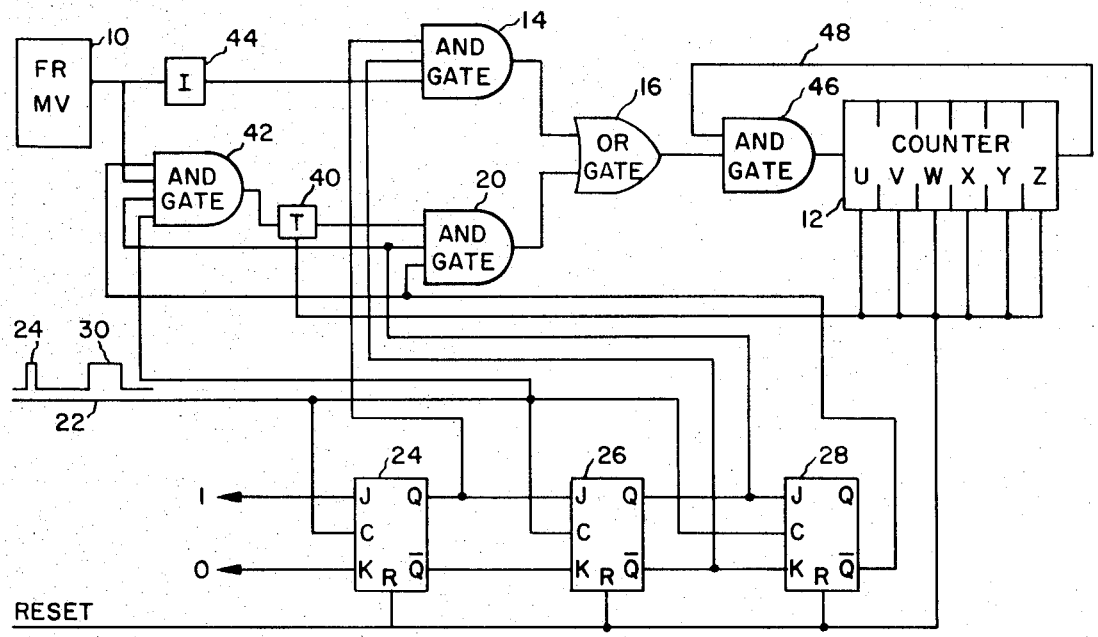

The foregoing objects and features, as well as further objects and features of the invention will become apparent with reference to the accompanying specification and drawings, in which FIG. 1, schematically illustrates the logic circuit implementing the present invention, FIG. 2 is a diagram of the waveforms resulting from the invention, FIG. 3 is a schematic representation of one form of logic element usable with the present invention, and FIG. 4 is an alternative embodiment of the present invention.

Referring to FIG. 1, a source 10 provides a series of counting pulses with a frequency or repetition rate determined by such factors as the switching speed of the system components and the resolution desired in the actual measurements. The source itself may actually comprise any desired pulse producing arrangement, such as a conventional free running multivibrator. A multistage counter 12 receives the pulses from the source 10 through a multiinput coincident AND gate 14 and an OR gate 16. The gates 14 and 16 are of conventional design, the AND gate 14 producing an output only when there is a coincidence of inputs thereto, and the OR gate 16 producing an output when there is an input on any or all of its input lines.

The output of the source 10 is further connected to the input of a binary count down stage 18. The function of the binary count down stage is to provide a series of pulses having a repetition rate precisely half that appearing at its input. The stage 18 may consist of any conventional frequency dividing network, as for example, a bistable "toggle" flip-flop. The pulses occurring at the output of the binary count down stage 18 are coupled to the counter 12 through an AND gate 20, and the OR gate 16.

Data pulses 30A and 30B, appearing along the input line 22, are introduced to a series of logical J—K flip-flops 24, 26 and 28. Each of the logical flip-flops include a J input, a K input, a clock input, a reset line and a pair of complementary output terminals. The first logical flip-flop 24 has its J and K terminals steered to the binary conditions 1 and 0 respectively. The 1 and 0 designations refer to the relative condition in each of the stages in the flip-flops. The inputs J and K of the logical flip-flop 26 are steered to the outputs of the logical flip-flop 24, while the J and K inputs of the logical flip-flop 28 are steered to the outputs of the logical flip-flop 26.

In operation, each of the flip-flops are reset by means of a suitable pulse on the reset line such that each of the flip-flops is in a 0 state. In this condition, each output Q of each flip-flop is set to 0, while each output $\bar{Q}$ is set to 1. For simplicity, the condition of a flip-flop will be referred to by the condition of its output Q, the output $\bar{Q}$ being understood as the complement of output Q. Since a 0 output from the flip-flops 24 and 26 are each respectively connected to an input of the AND gates 14 and 20, each of these gates is inhibited, and the counter is not receiving counting pulses from the source 10. Since the J—K logical flip-flop 24 is steered to a 1 condition, by virtue of the preset inputs on the J—K input lines, the appearance of the first initial data pulse 30A along the line 22 will cause the flip-flop 24 to revert from its 0 state to a 1 state. In this condition the output Q will be a 1 whereas the output $\bar{Q}$ will be a 0. Because the J—K input of the flip-flop 24 is steered to a 1 condition, further pulses appearing along the clock input of the flip-flop 24 will have no effect on its condition. Since the output Q of the flip-flop 24 is now in a 1 condition, while the output $\bar{Q}$ of the flip-flop 26 remains in a 1 condition, the AND gate 14 now has a coincidence of inputs on all of its input lines, and the pulses appearing from the source 10 will now pass through the AND gate 14, the OR gate 16 and into the counter 12. The counter 12 will then begin counting at a rate corresponding to a frequency F of the pulses from the source 10, as illustrated in FIG. 2. The counter will continue to count at the rate F until the appearance of a subsequent data pulse 30B along the line 22. Because of the steered input of flip-flop 24, the subsequent pulse will have no effect thereon. Logical flip-flop 26 however, the input of which is now steered to a 1 corresponding to the output of flip-flop 24, will undergo a change of state from its former 0 condition to a 1 condition. As a result, the output Q of the flip-flop 26 is in a 1 condition, whereas the output $\bar{Q}$ of the flip-flop 26 is now in a 0 condition. Since the output $\bar{Q}$ of the flip-flop 26 is coupled to the input of the AND gate 14, the flow of pulses from the source 10 to the counter 12 will thus be inhibited. The AND gate 20, receiving inputs from the pulse divider 18, the input line 22, the output $\bar{Q}$ of logical flip-flop 28, is gated on, and pulses appearing at one half the former rate are gated through the OR gate 16 into the counter 12. Since the output of a single flip-flop 26 is used to gate the gates 20 and 14, the switching of the count rate occurs as a single simultaneous operation. Counter 12 continues to count at one half its former rate for the duration of the subsequent data pulse 30B, until the trailing edge of the data pulse is reached. Since the input pulse line 22 forms one of the inputs of the AND gate 20, the disappearance of the subsequent data pulse effectively inhibits the AND gate 20 and blocks the flow of pulses through to the counter. At this point the accumulated store in the counter represents the binary equivalent of the distance from the initial pulse to the effective center 30C of the subsequent data pulse 30B. As illustrated in FIG. 2, assuming for purposes of illustration a pulse repetition rate illustrated therein as F, an examination of the number of pulses F occurring between the initial data pulse 24 and the effective center 32 of the data pulse 26 shows approximately 21 pulses. The counter input, as illustrated in FIG. 2, must therefore receive a total of 21 input pulses in accordance with the present invention. This is reflected by the binary conditions of the stages T through Z of the binary counter 12.

Referring again to FIG. 1, isolation of the counter from the effect of further pulses appearing along the input line 22 is accomplished by means of a logical flip-flop 28. Since the input of the logical flip-flop 28 is steered to a 1 condition by the output of logical flip-flop 26, a further pulse appearing along the input line 22 into the clock input of the logical flip-flop 28 will cause the flip-flop 28 to revert to a 1 condition, thereby providing a Q output of 0, which is in turn coupled to the input of the AND gate 20. The 0 input of the AND gate 20 effectively inhibits the gate and prevents the appearance of a pulse along the line 22 from allowing pulses appearing from pulse divider 18 to pass through to the counter 12.

A suitable form of J—K flip-flop used in accordance with the present invention is illustrated in FIG. 3. As shown, a logical J—K flip-flop is formed with a conventional bistable flip-flop 32 having first and second stages A and B, an AND gate 34 and an AND gate 36. For purposes of this example, it will be assumed that either of the stages A and B of the flip-flop 32 will assume a 1 condition in accordance with the presence of an input pulse thereto. Thus, the appearance of a pulse along the reset line 38, applied to the input of the stage B of the flip-flop 32, will result in the stage B being set to a 1 and the stage A being set to a 0. If the inputs J and K, as shown in FIG. 3, are preset to a 1 and a 0 respectively, the appearance of a pulse along the clock input line C will result in the AND gate 34 being enabled and passing a pulse therethrough to the stage A of the flip-flop 32, thereby changing the state of the flip-flop 32 to a condition resulting in a 1 in the stage A, and a 0 in the stage B. Since the K input remains fixed to a 0 condition, the appearance of further input pulses along the line C will have no effect on the condition of the flip-flop 32. Only the appearance of a subsequent pulse along the reset line 38 will result in the flip-flop 32 being reverted to its original condition.

Referring now to FIG. 4 an alternative arrangement for introducing pulses to the counter is illustrated. In this arrangement, the least significant stage T of the counter 12 is utilized as the binary count down stage or frequency divider stage for supplying pulses from the pulse source at one half their original repetition rate. The operation of FIG. 4 is similar to that disclosed in FIG. 1 and like elements will be designated by like reference numerals. In this embodiment the first stage 40 of the counter 12 is separated from the counter 12 by means of the AND gate 20. A further AND gate 42 couples the source 10 to the counter stage 40. Input line 22 is coupled to the AND gate 42, and the AND gate 20 and 42 each receive inputs from the Q output of flip-flop 26 and the Q̄ output of flip-flop 28. An inverter 44 couples the source of pulses 10 to the AND gate 14. During the initial counting period, beginning from the appearance of the initial pulse 24 along line 22, the counter stages U—Z will count at a rate F, the stage 40 of the counter being bypassed. During the period beginning with the appearance of pulse 30, when gate 14 is inhibited and gates 42 and 20 are enabled, counter stages U—Z will count at a rate equal to half the rate of the source 10. At the termination of the operation, the count in the registers T—Z of the counter 12 is representative of the distance from the initial pulse 30A to the effective center of the subsequent data pulse 30B. Since the frequency appearing at the output of the OR gate 16 is already reduced by a factor of two due to the action of the divider stage 40, pulse splitting is avoided. The action of inverter 44 results in the presentation of complementary input pulses to the OR gate 16 and further aids in preventing spurious signals.

For even further accuracy, the counter 12 is provided with an overflow line 48, feeding a signal back to an input of an AND gate 46. The other input of the AND gate 46 couples the output of the OR gate 16 to the counter 12. In operation, the effect of the AND gate 46 is to disconnect the counter and cease the counting operation when an overflow condition has occurred. This encompasses the possibility of the counter having cycled through an entire waiting period without having received any information.

It is understood that, although AND-OR terminology is used in connection with the gating circuitry, NAND-NOR logic may be used as well.

The above cited embodiments are intended as exemplary only, and while I have described my invention with a specific application and embodiment thereof, other modifications will be apparent to those skilled in the art without departing from the spirit and scope of the invention as defined by the appended claims.

I claim:

1. An arrangement for measuring the spacing between an initial pulse and the effective time center of a subsequent pulse of variable width, comprising a pulse counter, a source of pulses having a predetermined repetition rate, frequency dividing means coupled to said source for reducing said predetermined repetition rate by half, first gating means coupling said source to said counter, second gating means coupling said frequency dividing means to said counter, a first logic circuit having first and second inputs steered to fixed values and having a third input responsive to said initial pulse for providing a first output condition, a second logic circuit having first and second inputs steered to the output and complement thereof of said first logic circuit and a third input responsive to the leading edge of said subsequent pulse for providing a second output condition and a complement thereof, said first gating means enabled by said first output condition of said first logic circuit for coupling said source to said counter, said second output condition and complement thereof coupled to respective inputs of said first and second gating means and operative to simultaneously inhibit said first gating means and enable said second gating means for coupling said frequency dividing means to said counter, and means responsive to the termination of said subsequent pulse for inhibiting said second gating means.

2. The combination of claim 1 further including a third logic circuit connected to said second gating means and responsive to the presence of a further pulse for further inhibiting said second gating means.

3. The combination of claim 1 wherein each of said logic circuits comprises a logic flip-flop having a first input, a second input, a logic input, a reset input and a pair of complementary outputs, the first and second inputs of said first logic circuit being preset to 1 and 0 respectively, the first and second inputs of said second logic circuit each being connected to a respective output of said first logic circuit.

4. An arrangement for measuring the spacing between an initial pulse and the effective time center of a subsequent pulse of variable width, comprising a pulse counter, a source of pulses having a predetermined repetition rate, frequency dividing means coupled to said source for reducing said predetermined repetition rate by half, first gating means coupling said source to said counter, second gating means coupling said frequency dividing means to said counter, third gating means coupling said source of pulses to said frequency dividing means, means enabling said third gating means simultaneously with said second gating means, a first logic circuit having first and second inputs steered to fixed values and having a third input responsive to said initial pulse for providing a first output condition, a second logic circuit having first and second inputs steered to the output and complement thereof of said first logic circuit and a third input responsive to the leading edge of said subsequent pulse for providing a second output condition and a complement thereof, said first gating means enabled by said first output condition of said first logic circuit for coupling said source to said counter, said second output condition and complement thereof coupled to respective inputs of said first and second gating means and operative to simultaneously inhibit said first gating means and enable said second gating means for coupling said frequency dividing means to said counter, and means responsive to the termination of said subsequent pulse for inhibiting said second gating means.

5. The combination of claim 4 further including a third logic circuit connected to said second gating means and responsive to the presence of a further pulse for further inhibiting said second gating means.

6. The combination of claim 4 wherein each of said logic circuits comprises a logic flip-flop having a first input, a second input, a logic input, a reset input and a pair of complementary outputs, the first and second inputs of said first logic circuit being preset to 1 and 0 respectively, the first and second inputs of said second logic circuit each being connected to a respective output of said first logic circuit.